Figure 3:
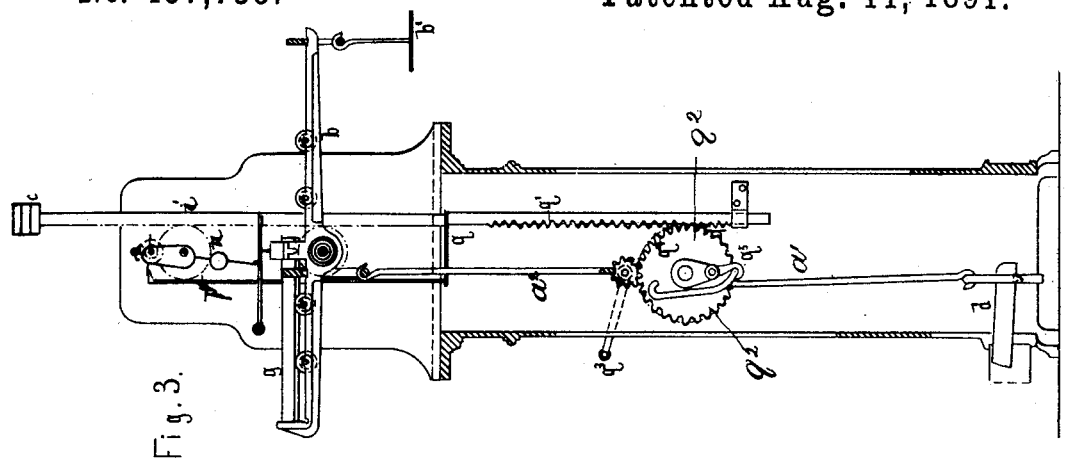

(No Model.) 8 Sheets—Sheet 1.
C. SCHENCK.
AUTOMATIC BALANCE.
No. 457,733. Patented Aug. 11, 1891.
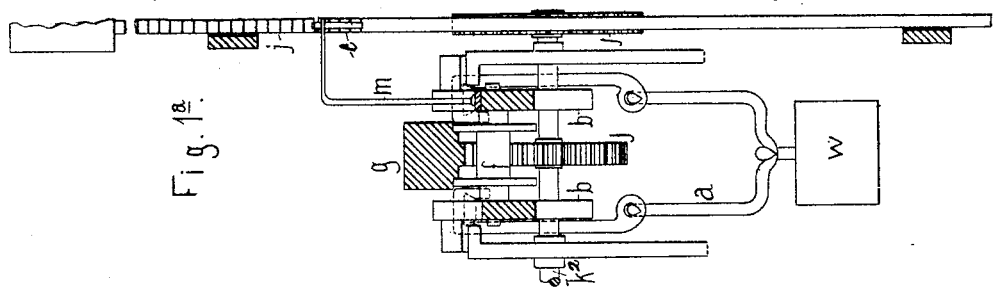
Fig. 1ª.
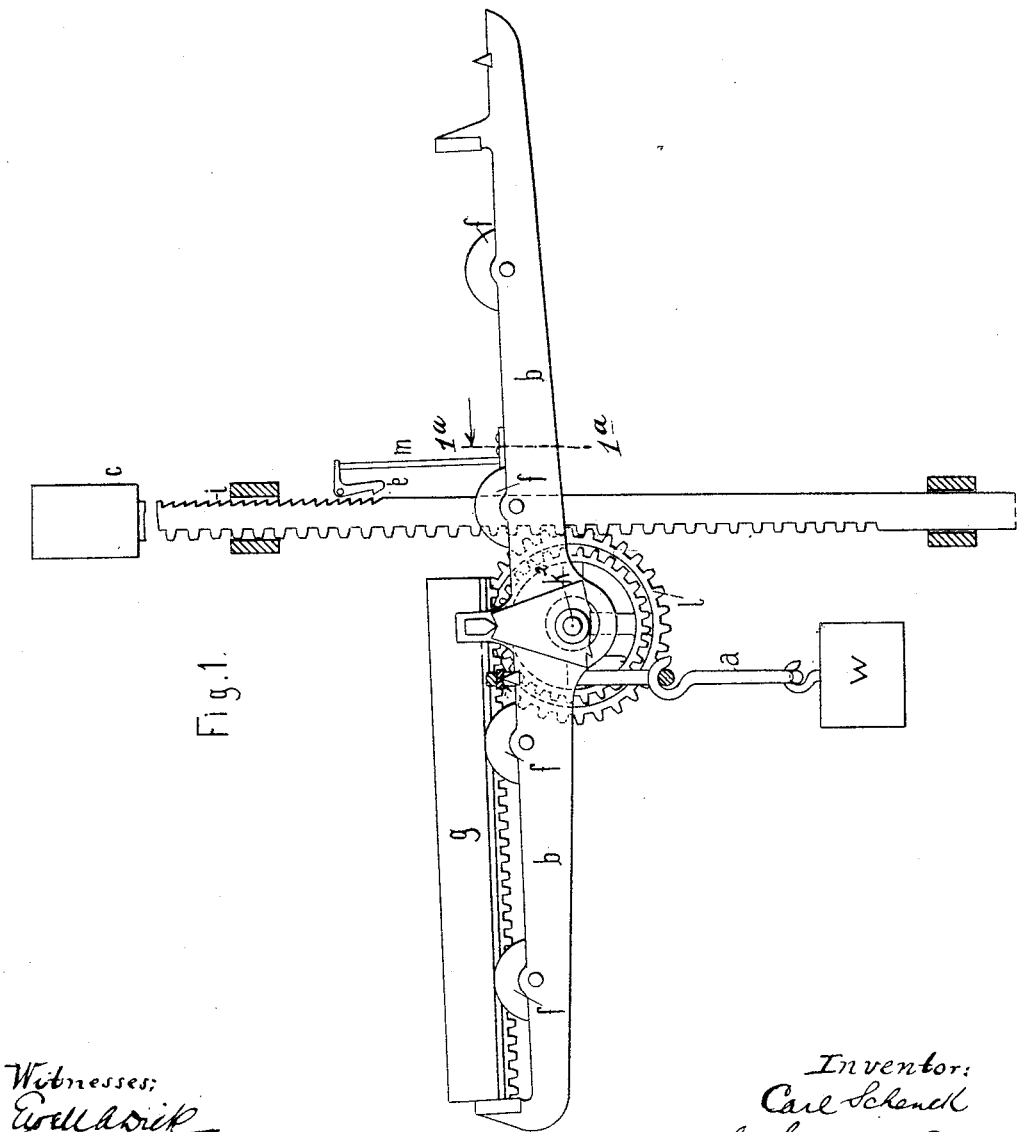
Fig. 1.
Witnesses:
Ewell A Dick
W. R. B. Atkinson
Inventor:
Carl Schenck
by Chevallier Bailey
his attorney.

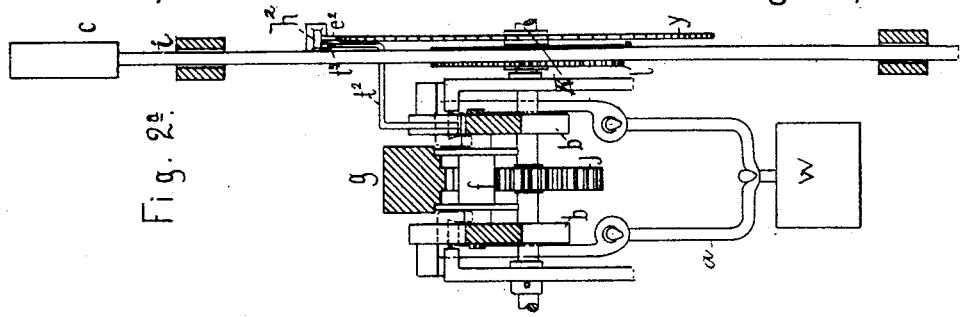
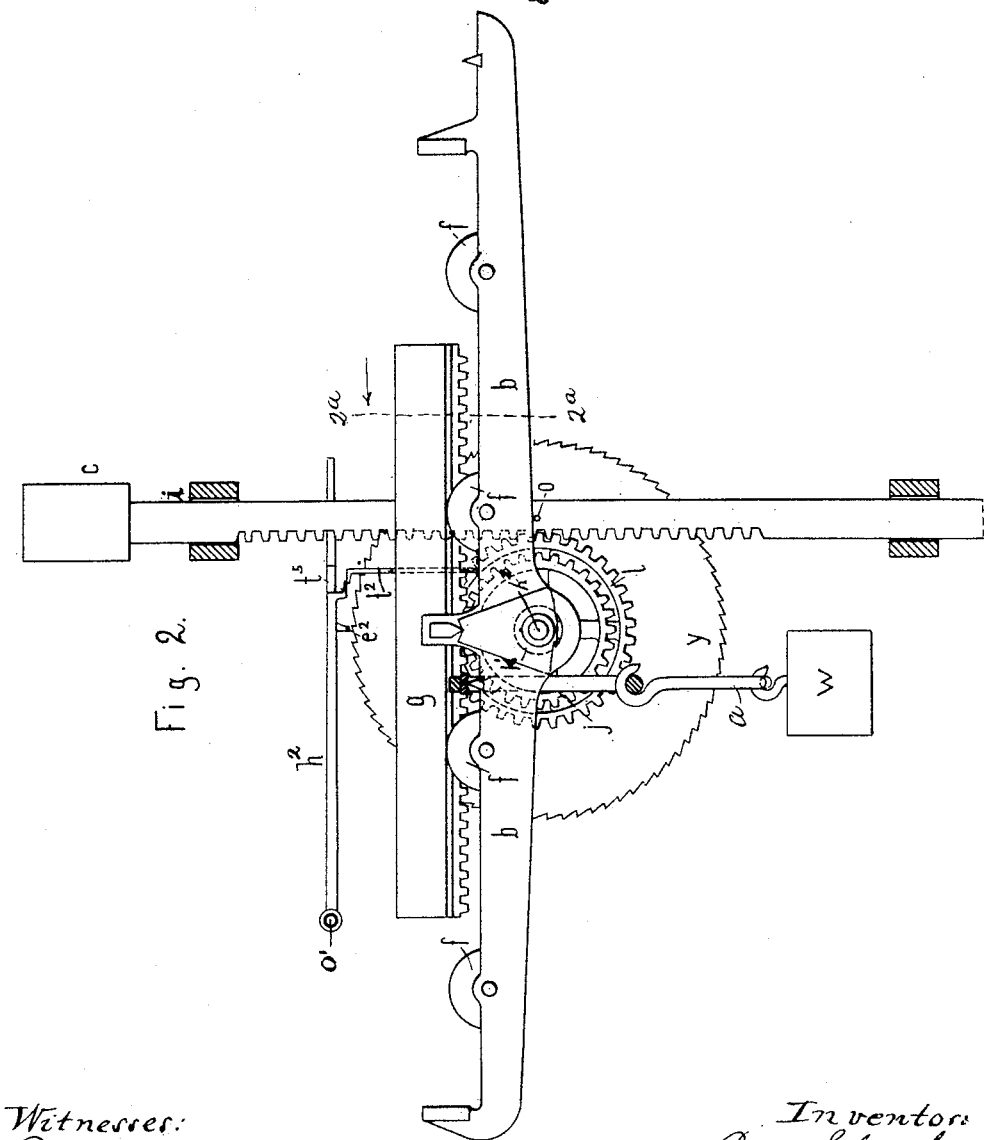

(No Model.) 8 Sheets—Sheet 3.

C. SCHENCK.
AUTOMATIC BALANCE.

No. 457,733. Patented Aug. 11, 1891.

Witnesses:

Inventor:
Carl Schenck (No Model.) 8 Sheets—Sheet 4.

C. SCHENCK.
AUTOMATIC BALANCE.

No. 457,733. Patented Aug. 11, 1891.

Witnesses:

Inventor:
Carl Schenck (No Model.) 8 Sheets—Sheet 5.

C. SCHENCK.
AUTOMATIC BALANCE.

No. 457,733. Patented Aug. 11, 1891.

Witnesses:

Inventor,
Carl Schenck

THE NORRIS PETERS CO., PHOTO-LITHO., WASHINGTON, D. C.

(No Model.) 8 Sheets—Sheet 6.

C. SCHENCK.
AUTOMATIC BALANCE.

No. 457,733. Patented Aug. 11, 1891.

Witnesses:

Inventor:
Carl Schenck (No Model.) 8 Sheets—Sheet 7.
C. SCHENCK.
AUTOMATIC BALANCE.

No. 457,733. Patented Aug. 11, 1891.

Witnesses: Inventor:
Carl Schenck
by Marcellus Bailey
Attorney (No Model.) 8 Sheets—Sheet 8.

C. SCHENCK.
AUTOMATIC BALANCE.

No. 457,733. Patented Aug. 11, 1891.

Witnesses:

Inventor:
Carl Schenck

UNITED STATES PATENT OFFICE.

CARL SCHENCK, OF DARMSTADT, GERMANY.

AUTOMATIC BALANCE.

SPECIFICATION forming part of Letters Patent No. 457,733, dated August 11, 1891.

Application filed August 1, 1888. Serial No. 281,634. (No model.) Patented in Germany September 4, 1887, No. 44,605; in France March 5, 1888, No. 189,128; in England June 23, 1888, No. 9,167; in Italy September 30, 1888, XLVII, 299, and in Austria-Hungary April 7, 1890, No. 43,557 and No. 13,005.

*To all whom it may concern:*

Be it known that I, CARL SCHENCK, a subject of the Grand Duke of Hesse, residing at Darmstadt, in the grand duchy of Hesse, German Empire, have invented new and useful Improvements in Automatic Balances, (for which I have obtained Letters Patent in Germany, September 4, 1887, No. 44,605; in Great Britain, June 23, 1888, No. 9,167; in France, March 5, 1888, No. 189,128; in Italy, September 30, 1888; No. 299, Volume XLVII; in Austria, April 7, 1890, No. 43,557, and in Hungary, April 7, 1890, No. 13,005,) whereof the following is a specification.

My invention relates to automatic balances; and its object is to produce the automatic action of the balance and the indication of the weight of the load by means of a weight arranged to travel on the weighing-beam, to be shifted thereon lengthwise by a propelling mechanism, and to be stopped as soon as it has arrived at a point at which it poises or tilts the beam.

Moreover, the invention has in view the combination, with the beam, of two or more traveling weights of different size and propelling mechanisms that shift the said weights in succession in the order of their size (beginning with the largest one) and in alternate directions, each weight being moved a certain distance beyond the point at which it tilts the beam, and each weight after the first one deducting the excess brought to bear on the beam by the preceding weight. Supposing the balance to be provided with four weights adapted to determine the thousands, hundreds, tens, and units of the number of pounds or other units of weight contained in the load and the balance to be charged with a load weighing between one thousand and ten thousand pounds and the automatic weighing apparatus to be in operation, first of all the traveling weight for the thousands of pounds is shifted on the beam away from the load side— say to the right—until, after tilting the beam, it comes to a point at which its action on the balance is equal to the full number of thousands of pounds being next above the true weight of the load, whereupon it is stopped. Thereafter the traveling weight for the hundreds of pounds is shifted in the opposite direction or to the left until, after having tilted the beam the other way, it arrives at the point at which it acts on the balance with a force equal to the full number of hundreds of pounds being next above the surplus brought to bear on the right-hand end of the beam by the first weight, the difference in hundreds of pounds being thus practically deducted. Subsequently the third traveling weight moves in the right-hand direction up to the point at which it balances the full tens of pounds next above the true number, and finally the fourth weight is shifted to the left for deducting the surplus of units. The movement of the traveling weight, or of each weight, in case there are two or more, is produced by a propelling mechanism actuated by a vertically-movable driving-weight, and the traveling weight is stopped, together with the said mechanism, by means of a pawl that engages with one of a series of notches provided for upon the surface of any suitable part of the propelling mechanism or part connected therewith, the said pawl or its equivalent being caused or allowed to operate by the motion of the weighing-beam, when the same is poised or tilted, through the medium of the traveling weight. If two or more traveling weights are employed, the balance is, moreover, provided with contrivances whereby each mechanism, except the first one, is maintained at rest while the preceding one operates, and is released as soon as the latter is stopped. Besides, the said mechanisms are provided with means for regulating the speed of their motion. The weight of the load determined by the traveling weight or weights is indicated by the propelling mechanism or or mechanisms, or by a part or parts connected thereto—for instance, by a rotating disk or a series of such disks having numerals on their periphery. With these disks a printing apparatus may be combined for registering the results of the weighing operations. The aforesaid driving-weights are simultaneously raised and the printing apparatus is worked through the medium of mechanism brought into action either by hand or by an auxiliary weight, is lifted by the pressure of the load on the balance, and liberated when the load is removed.

Figure 4:
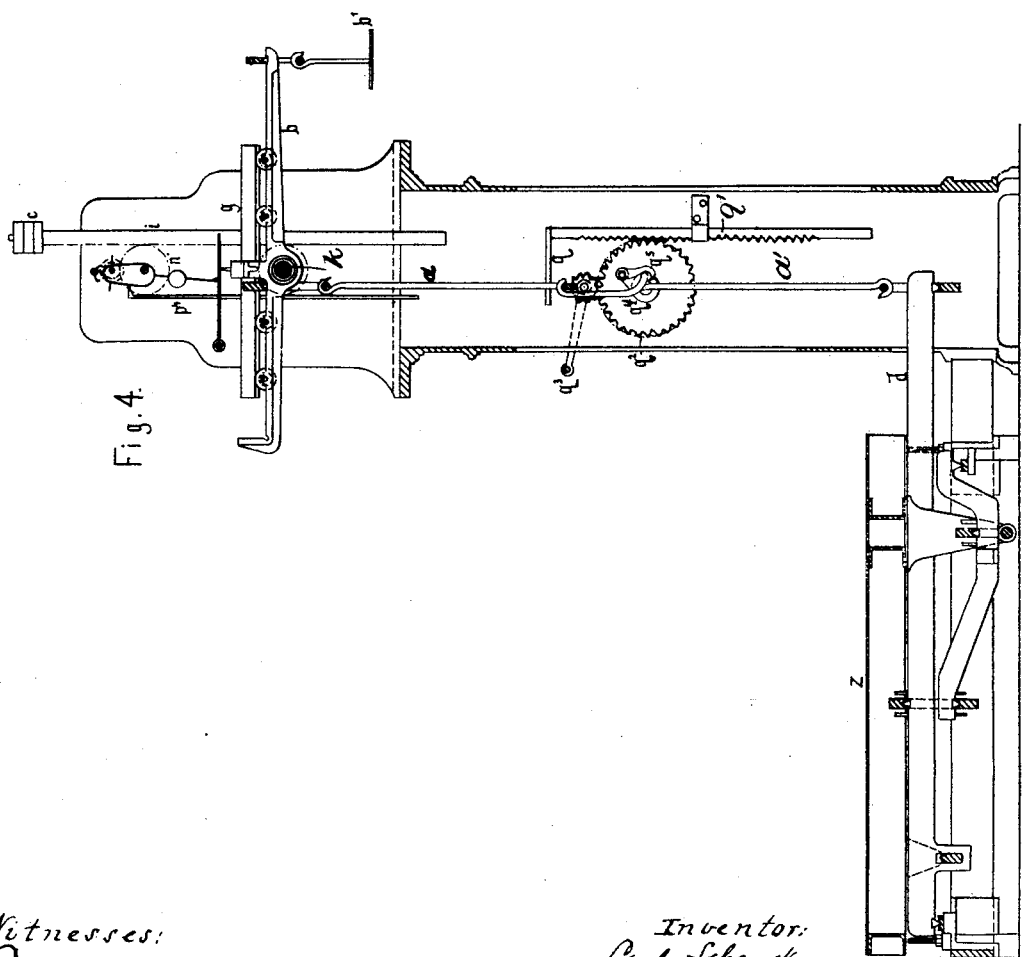
Figure 6:
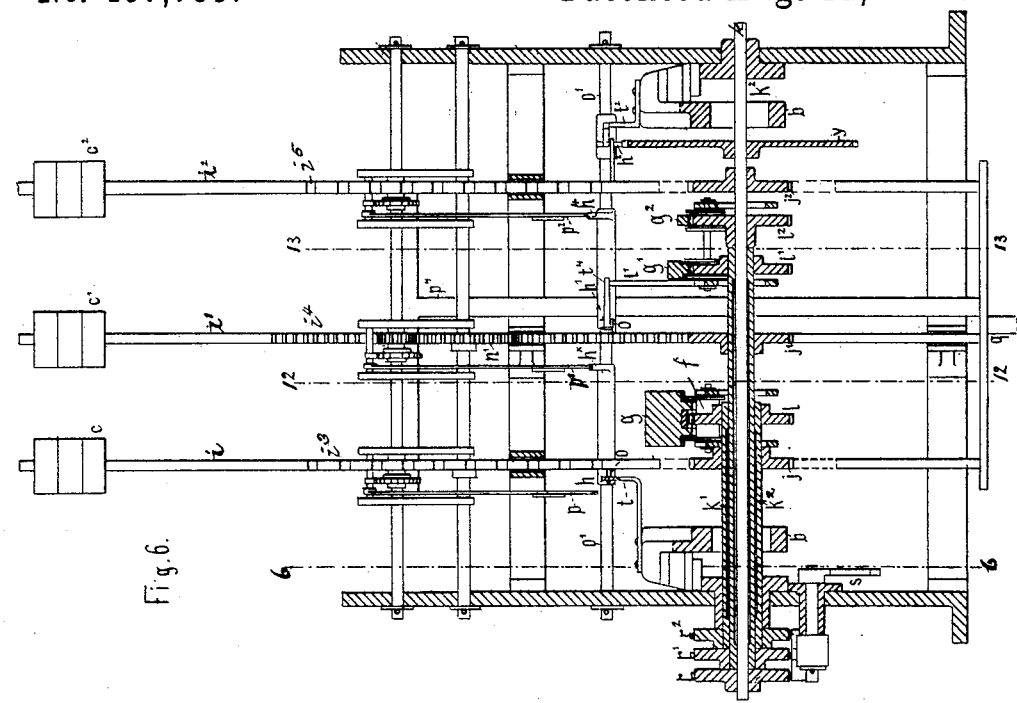
Figure 5:
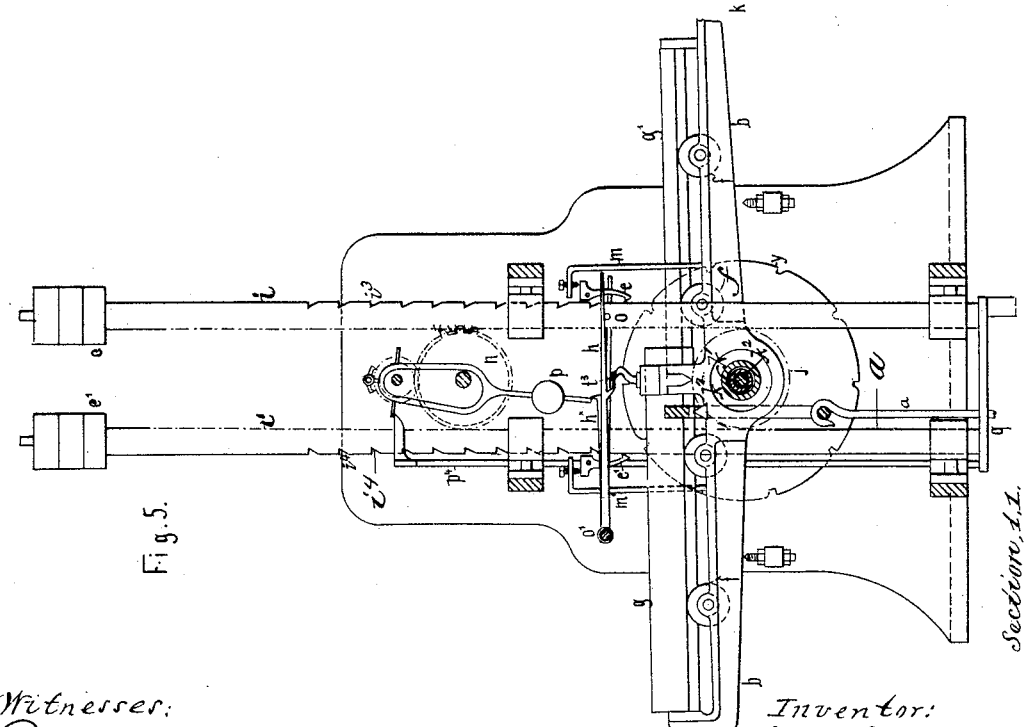
Figure 10:
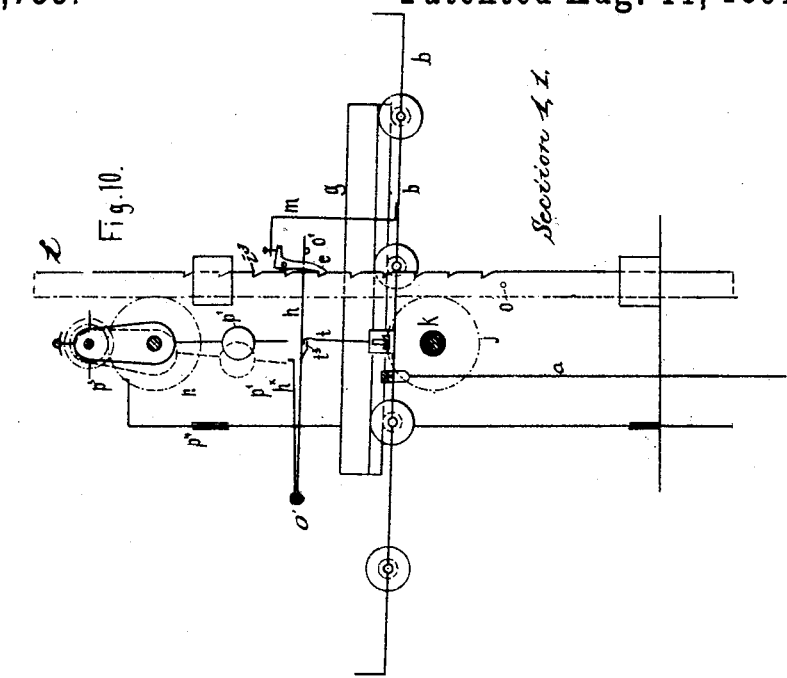
Figure 12:
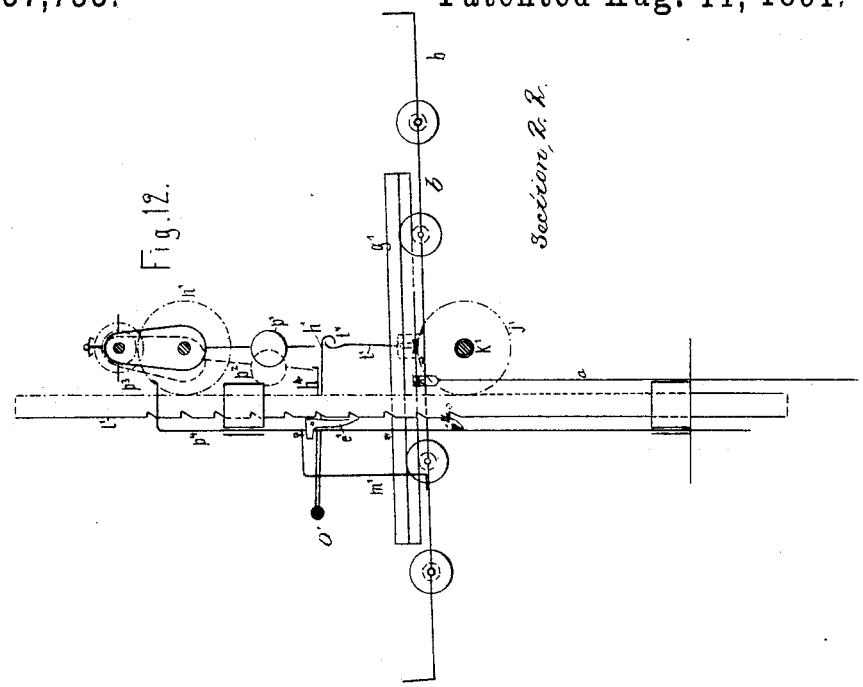
Figure 11:
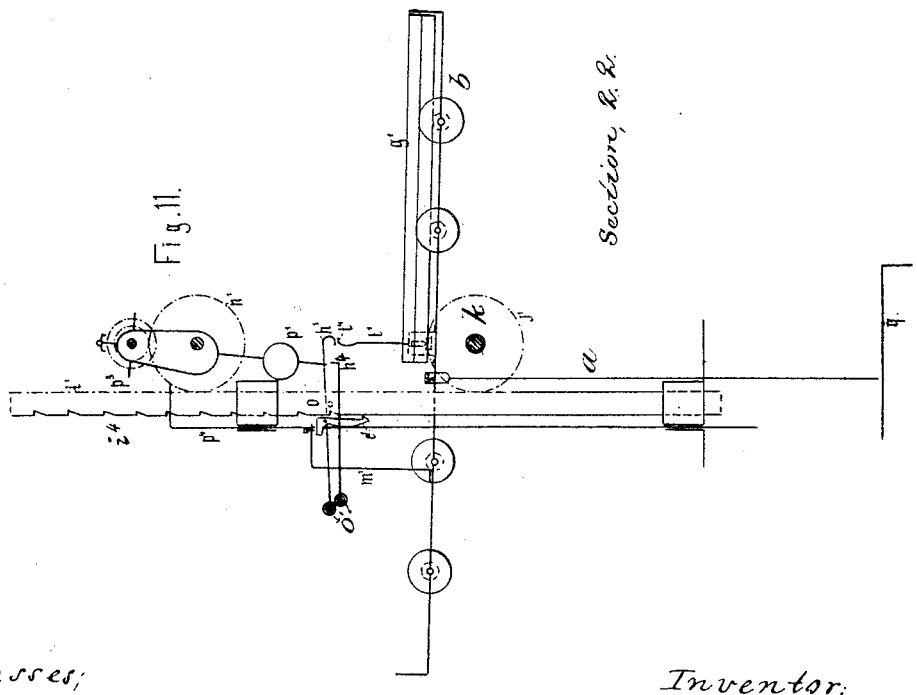
Figure 14:
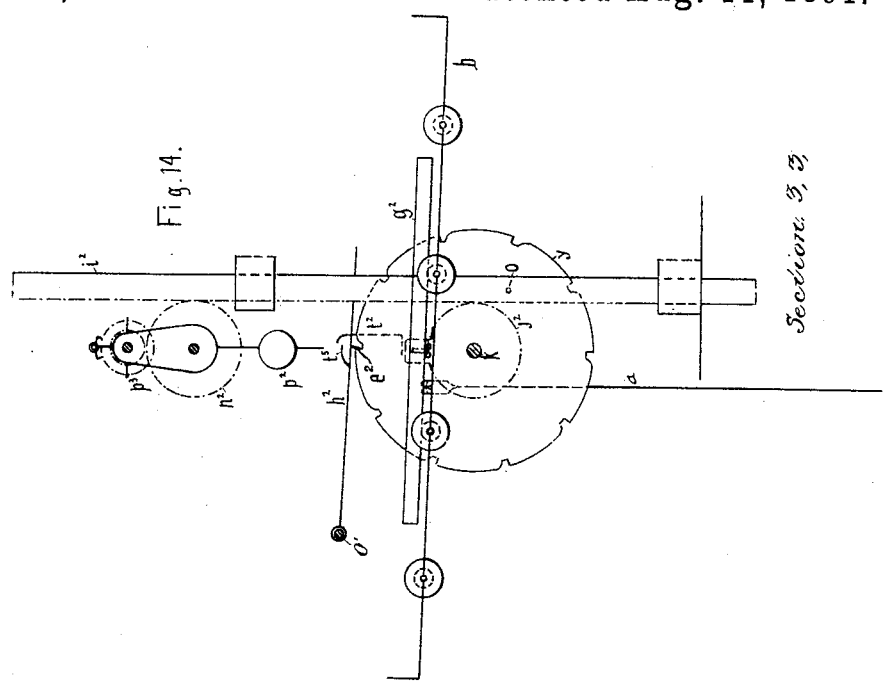
Figure 13:
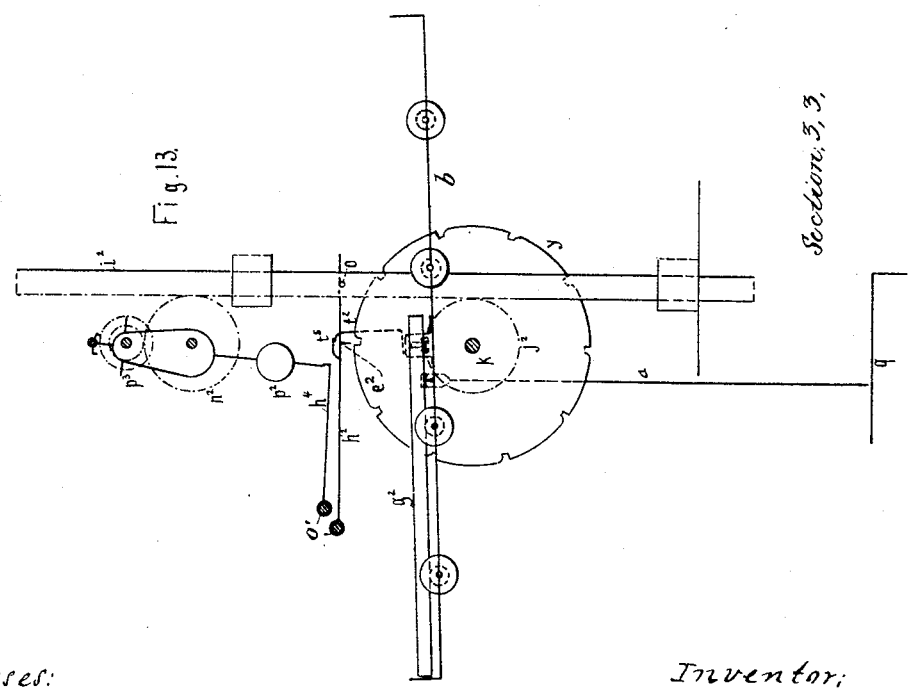

Figure 1 of the annexed drawings is a sectional elevation, and Fig. 1ª a sectional end view, of a weighing-beam with a single traveling weight and apparatus for automatically actuating the same. Figs. 2 and 2ª are like views of a modification thereof. Fig. 3 is a sectional view of the complete balance, in which, however, some of the details are omitted. Fig. 4 is a sectional view of a portion thereof with some of the parts in different position. Fig. 5 is a sectional elevation, taken on the line 6 6 of Fig. 6, of a weighing-beam carrying three traveling weights of different size, and consequently of different gravity, and of the mechanism for automatically actuating the weights, a portion of the right-hand end of the beam being broken. Fig. 6 is a central transverse sectional view, and Fig. 7 a plan, of the mechanism shown in Fig. 5. Fig. 8 shows the automatic recording device in elevation, the frame of the apparatus being omitted in order to allow all parts to be represented in full lines. Fig. 9 is a diagrammatic section on line 1 1 of Figs. 6 and 7 and showing the weighing-beam depressed at its left-hand end and the first mechanism for automatic action released and about to commence work. Fig. 10 is a like view representing the same mechanism at the end of its operation and the beam tilted the other way. Fig. 11 is a diagrammatic sectional view on line 2 2, Figs. 6 and 7, and in which the second mechanism is released and on the point of starting, the beam being in the same position as in Fig. 10. Fig. 12 is a diagrammatic section on the line 12 12 of Figs. 6 and 7, and shows the mechanism at the end of its operation, the beam being again tilted down at its left-hand end. Figs. 13 and 14 are sectional views on line 13 13, Figs. 6 and 7, and represent the third mechanism at the beginning and the end of its action, respectively.

$b$ indicates the weighing-beam, and $a$ the rod through which the load W to be weighed acts upon the beam.

$g$ is the traveling weight running on and guided by the rollers $f$.

$c$ is the driving-weight, which is fixed to the traveling bar $i$, (or weight-bar,) movable in fixed guides. The said weight-bar is provided with teeth, by means of which it gears with a pinion $l$, fixed to an axle $k$, that carries another pinion $j$, meshing with teeth on the under side of the traveling weight $g$. The weight-bar has on its surface (being opposite to the aforesaid teeth) notches, and by its side is arranged a pawl $e$, Figs. 1 and 1ª, adapted to engage therewith. When the beam is depressed at its left-hand end by the load W, an upright arm $m$ of the beam bears from below against an arm of the pawl and keeps the pawl out of engagement with the notches of the bar $i$; but as soon as the beam is tilted down at its right-hand end by the action of the traveling weight $g$ the arm $m$ is withdrawn from the pawl, so that the pawl then engages with the notch which is opposite to it, the propelling mechanism and the traveling weight being thereby stopped.

In the modified arrangement shown by Fig. 2 the stopping device consists in the notched disk $y$, fixed to the axle $k$, a pawl $h^2$, arranged to drop with its beak $e^2$ into the notches of the disk, and an arm $t^2$ is fixed to the beam $b$ and so arranged that when the beam is in equilibrium—i. e., in horizontal position—the tip of the arm will be below a transverse edge $t^5$, formed upon a small branch of the pawl $h^2$ or upon the pawl itself, whereas when the beam is depressed at the left-hand end by the load the said tip is under the body of the pawl or of its branch. The pawl will thus be supported and kept free from the disk $y$ by the arm $t^2$ until the beam is poised or tilted by the traveling weight. Previous to the weighing operation the weight-bar on being raised for renewed action disengages, by means of a pin $o$, the pawl from the disk $y$ and raises it sufficiently to permit the arm to slip under the pawl or its branch when the beam is tilted by the pressure of the load. It will readily be perceived that the arm $t^2$ is an equivalent of the aforesaid arm $m$, inasmuch as both operate to release the pawl, which by its engagement with a notched surface in connection with the propelling mechism serves to stop the said mechanism and the traveling weight.

The described balances are shown in the figures unprovided with means for regulating the motion of the propelling mechanism, although for a proper working of the apparatus such means are of considerable advantage. Preferably the said regulation is brought about by a simple pendulum clock-work, the driving-wheel whereof gears with the rack-teeth of the weight-bar, as will be described hereinafter.

In Figs. 5 to 14, representing the balance with three traveling weights, $g$ $g'$ $g^2$ are the said weights, $c$ $c'$ $c^2$ the respective driving-weights, $i$ $i'$ $i^2$ the weight-bars having rack-teeth $i^3$ $i^4$ $i^5$ on one side. $j$ $j'$ $j^2$ and $l$ $l'$ $l^2$ are the pinions, and $k$ $k'$ $k^2$ the axles connecting together the traveling weights and weight-bars, the axles $k'$ and $k^2$ being tubular and passed one over the other and over the solid axle $k$. These axles also carry the numeral-disks $r$ $r'$ $r^2$. The two propelling mechanisms that operate the first and second traveling weights $g$ and $g'$ and comprising, respectively, the parts $c$, $i$, $j$, $l$, and $k^2$ and $c'$, $i'$, $j'$, $l'$, and $k'$ are alike to the one described with reference to Fig. 1, except that the pawls $e$ and $e'$ are so balanced as to be normally free from the notches of the bars $i$ and $i'$, and that the arms $m$ and $m'$ are arranged to press the pawls against the bars $i$ and $i'$ when the beam is tilted by the action of the respective traveling weight $g$ or $g'$, the said arms $m$ and $m'$ being made sufficiently resilient as not to hinder the oscillation of the beam when they press the pawls against a portion of either weight-bar being between two notches. As regards the arm $m'$, this resiliency is also required when the arm presses the pawl $e'$ against the bar $i'$ at the first oscillation of the beam produced by the load, which is not to have effect on the second mechanism. Provided that the weight of the load is to be expressed in the decimal system, the number of the notches in each of the said weight-bars is ten.

The third propelling mechanism actuating the traveling weight $g^2$ and comprising the parts $c^2$, $i^2$, $j^2$, $l^2$, and $k$ is alike to the one represented by Fig. 2, inasmuch as its stoppage is brought about by means of the disk $y$ and the pawl $h^2$, the said disk having, however, also ten notches, the same as the bars $i$ and $i'$.

With the rack-teeth of the weight-bars $i$ $i'$ $i^2$ gear the respective toothed wheels $n$ $n'$ $n^2$, being the driving-wheels of the regulating clock-works having the pendulums $p$ $p'$ $p^2$.

Between the first and second propelling mechanisms a connection is established by means of a double-armed lever $h$ $h^\times$, Figs. 5, 6, 7, and 10, the arm $h$ whereof extends across the weight-bar $i$ of the first mechanism, the said bar being provided with a pin $o$ for raising the lever when the bar is in its uppermost position. The second arm $h^\times$ extends into the path of the bar of the pendulum $p'$ belonging to the second mechanism, and has at its end a projection adapted to catch the pendulum when the latter is swung outward, and the arm $h^\times$ is raised through the medium of the arm $h$. Besides, the beam $b$ is provided below the arm $h$ with a tongue $t$, alike to the arm $t^2$ mentioned relatively to the modified stopping device and adapted to support the arm $h$ close to a transverse edge $t^3$, formed thereon or on a branch of the arm, the tongue and the edge $t^3$ being so arranged relatively to each other that when the beam is tilted by the overbalancing action of the first traveling weight the tongue, oscillating to the right and slipping past the edge $t^3$, allows the lever $h$ $h^\times$ to drop, in consequence whereof the arm $h^\times$ releases the pendulum $p'$ of the second mechanism, which thereupon commences to work. Between the second and third mechanisms a like connection is established by means of a lever having the two arms $h'$ and $h^4$, Figs. 7 and 12, while the beam is provided below the transverse edge $t^4$ of the arm $h'$ with the tongue $t'$, co-operating with the arm $h'$ in analogous manner as the tongue $t$ co-operates with the arm $h$, except that it is an oscillation of the tongue $t'$ to the left, which causes it to slip past the edge $t^4$ and allows the lever $h'$ $h^4$ to drop. The aforesaid levers $h$ $h^\times$ $h'$ $h^4$ and the pawl $h^2$ are mounted on a bar $o'$, so that their centers are all in a line; but for sake of greater clearness these centers are shown in Figs. 11 and 13 as being by the side of each other.

In order that previous to any weighing operation all the pendulums be swung into a position from which on being released they will commence to oscillate, and that the second and third pendulums $p'$ and $p^2$ be engaged by the corresponding lever-arms $h^\times$ and $h^4$, the pendulum-bars have lateral arms $p^3$, that are acted upon from below simultaneously with the raising of the driving-weights through the medium of a lifting-bar $p^4$. The levers $h$ $h^\times$ and $h'$ $h^4$ being at the same time raised by the pins $o$ on the weight-bars, the pendulums $p'$ and $p^2$ will be caught. As soon as the lifting-bar $p^4$ is thereupon lowered the first pendulum commences to oscillate, the apparatus being thereby set to work.

The means for raising the driving-weights and the lifting-bar $p^4$ consist in a plate $q$, to which is fixed a rack $q'$, Figs. 3 and 4, gearing with a spur-wheel $q^2$, connected by a pinion to a crank $q^3$. When this crank is rotated one way, the plate $q$, acting from below against the weight-bars $i$ $i'$ $i^2$, Figs. 5 and 6, and the lifting-bar $p^4$, lifts these parts and the weights $c$ $c'$ $c^2$, while at the same time the traveling weights $g$ $g'$ $g^2$ are brought to their initial positions by means of their connections with the weight-bars. The crank $q^3$ being thereupon turned the other way, the plate $q$ is lowered, so that the apparatus is then free to operate.

The mechanism shown in Figs. 3 and 4, in combination with the wheel $q^2$, serves to link together and detach from each other the two rods $a$ and $a'$, connecting the weighing-beam and the lever $d$ of the system of levers carrying the platform $z$, the rod $a'$ being hooked to the rod $a$ by means of the crank $q^4$ and the hook $q^5$ when the wheel $q^2$ is rotated to lower the plate $q$, whereas the rods are disconnected when the wheel is rotated the other way. This construction does not, however, form any part of the present invention.

The balance is equilibrated when the weighing-platform is unloaded and the traveling weights are in their initial positions by means of weights placed on the weight-support $b'$, Figs. 3 and 4. Supposing that the platform of the balance has been charged with a load weighing, for instance, five hundred and forty-seven pounds and that the plate $q$ has been raised and lowered again, the beam $b$, the first propelling mechanism, and the parts in connection therewith will be in the position shown in Fig. 9. The left-hand end of the beam is depressed, the lever-arm $h$ is raised by the pin $o$, so as to be free from the tongue $t$, and the lifting-bar $p^4$ is lowered, so that the pendulum $p$ is at liberty to oscillate. The weight-bar $i$ will consequently descend and propel the traveling weight $g$ to the right. At the commencement of the descent of the bar $i$ the lever-arm $h$, becoming free from the pin $o$, drops upon the tip of the tongue $t$ and is supported thereby, so that it keeps the arm $h^\times$, Fig. 10, in engagement with the pendulum $p'$. When the weight $g$, during its motion to the right, passes the point in which it balances the load of five hundred and forty-seven pounds, it tilts the beam into the position shown by Fig. 10, the resilient arm $m$ consequently pressing the pawl $e$ with its beak against the portion of the side of the bar $i$ being between the fifth and the sixth notch, which portion is at this moment opposite to the said beak, and when the sixth notch corresponding to six hundred pounds has come in register with the beak the latter drops into the notch, thereby stopping the first propelling mechanism. It would seem to be clear that although the arm of the first propelling weight-bar drops into the six-hundred notch in ascertaining the weight of merchandise weighing less than that amount and more than the five-hundred notch represents, yet the numeral-disk for the first propelling-bar should be adjusted, as set forth, to indicate five hundred pounds. This surplus or difference is automatically determined, as also disclosed, by the tilting of the beam to the right, together with the intermediate mechanism between the first and second propelling weight-bars, and then by the tilting of the beam to the left, together with the intermediate mechanism between the second and third propelling weight-bars. Actually a surplus amounting to six hundred pounds, minus five hundred and forty-seven pounds, or fifty-three pounds, has thus been brought to bear on the right-hand side of the beam; but the numeral-disk $r$, Figs. 6 and 7, of the said mechanism is adjusted to indicate at the time five hundred pounds as the true number of hundreds of pounds contained in the load. Upon the beam being tilted as stated, the tip of the tongue $t$ slips past the edge $t^3$ of the arm $h$, in consequence whereof the said arm drops on the fixed pin $o'$ and the arm $h^\times$ releases the pendulum $p'$. (Shown in Fig. 10 in dotted lines and in Fig. 11 in full lines.) This pendulum, impelled by the bar $i$ and the weight $c'$ fixed thereto, (the weights $c$ $c'$ $c^2$ are not shown in Figs. 9 and 14,) then commences to oscillate, while the weight $g'$ is moved to the left and the arm $h'$, liberated by the pin $o$ on the bar $i'$, drops on the tongue $t'$. The bar $i'$ continues to descend and to move the weight $g'$ until the latter tilts the beam down at the left-hand end, as in Fig. 12, which it will do as soon as it overbalances the above surplus of fifty-three pounds. The resilient arm $m'$ then presses the pawl $e'$ against the bar $i'$ and causes it to engage with the sixth notch thereof when the same has come opposite to it, the second mechanism and the weight $g'$ being thereby stopped in the position in which the latter counterbalances sixty pounds—i. e., seven pounds more than the actual surplus—the numeral-disk $r'$, however, indicating fifty pounds. These seven pounds are again deducted from the said sixty pounds by the third mechanism and the traveling weight $g^2$, the said mechanism being set free by the tongue $t'$ slipping past the edge $t^4$ of the arm $h'$ when the beam is tilted by the weight $g'$, and the arm $h^4$, releasing the pendulum $p^2$ in like manner as described with reference to the foregoing mechanism.

Fig. 12 shows the lever-arms $h'$ and $h^4$, and Fig. 13 the arm $h^4$ in the position in which the release of the pendulum $p^2$ takes place. When the weight $g^2$ has been shifted far enough to act on the right-hand end of the beam with a force slightly exceeding the aforesaid seven pounds and to tilt the beam down at this end, the arm $t^2$ allows the pawl $h^2$ to drop and to engage by its beak $e^2$ with the first notch of the disk $y$ coming opposite to it, this being, under the presupposed conditions, the eighth notch, counting the zero-notch as the first one of the series. The numeral-disk $r^2$ is, however, adjusted to indicate seven pounds. In view of preventing the tongue $t$ from striking against the edge $t^3$ when subsequent to the dropping of the lever-arm $h$ the tongue oscillates to the left, the tip thereof is curved to the left, so that it will pass above the said edge. For the like reason the tip of the tongue $t'$ is curved to the right and that of the arm $t^2$ again to the left.

Figure 7:
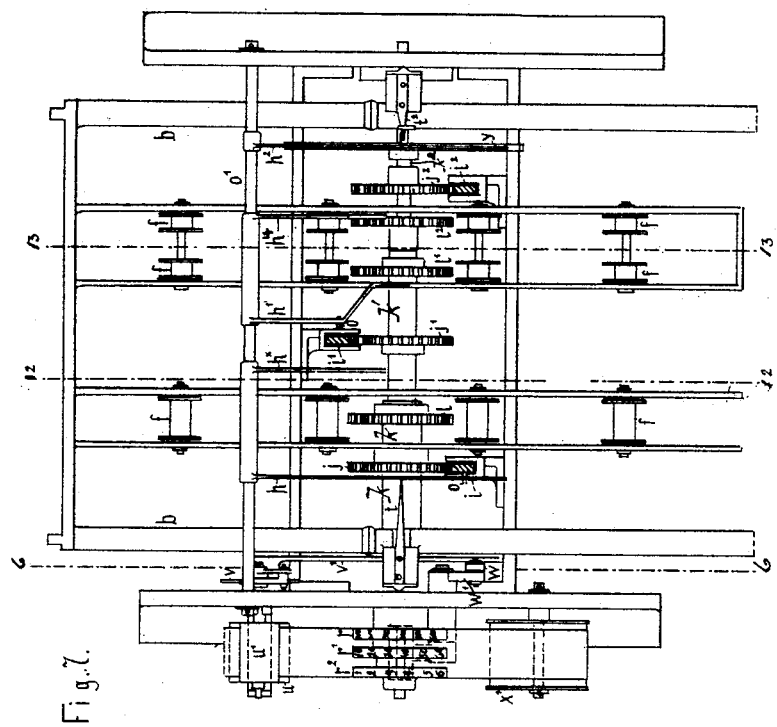
Figure 8:
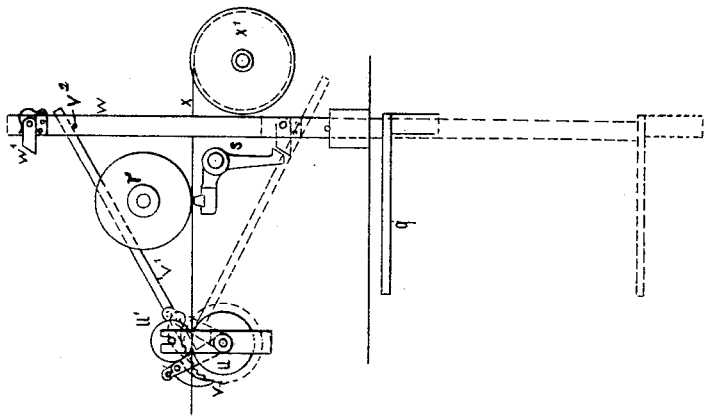
Figure 9:
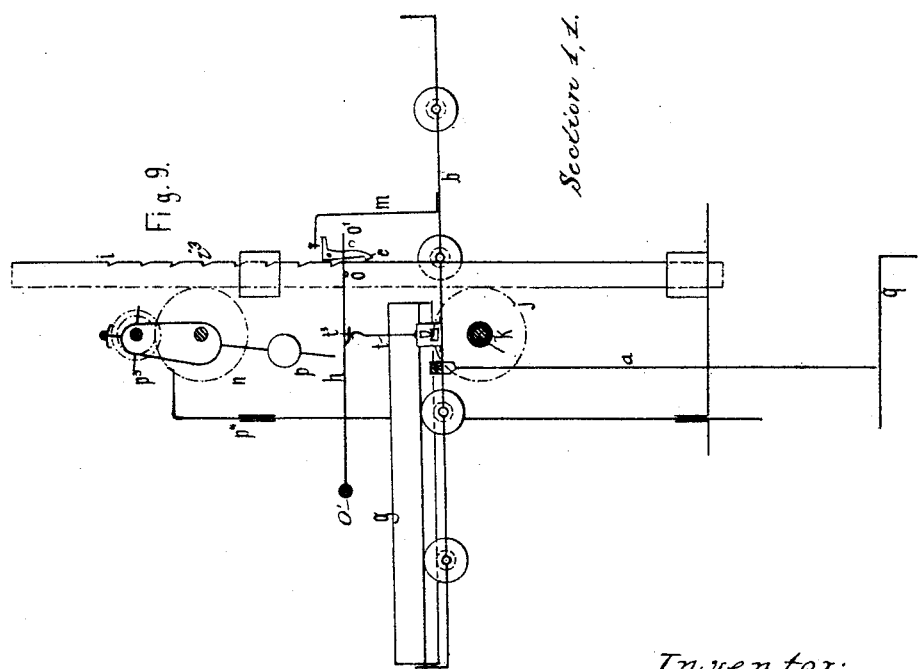

The printing device shown by Figs. 6, 7, and 8 comprises, in addition to the numeral-disks $r\ r'\ r^2$, which in this case have projecting characters, the printing-lever $s$, the two friction-rollers $u\ u'$, serving to draw forward a strip of paper $x$ from a roll $x'$, the ratchet-wheel $v$, connected to the roller $u$, the lever $v'$, carrying a pawl engaging in the teeth of the wheel $v$, and the bar $w$, having a latch $w'$ and arranged to be raised by the aforesaid plate $q$, the said latch having a beveled end face, which, when the bar $w$ is raised, acts against a beveled projection on the vertical arm of the lever $s$, and thereby presses the horizontal arm of the same against the numeral-disks, so that an impression of the numeral will be made on the strip of paper $x$ passed between the lever and the disks. At its downward motion the latch $w'$ rises on meeting the projection on the lever, and after it has passed the same it is returned to its normal position by a spring. The lever $v'$ is actuated by a pin $v^2$ on the bar $w$, the strip $x$ being thus drawn forward through each upward stroke of the bar $w$, produced simultaneously with the operation of returning to their initial positions the propelling mechanism of the balance subsequent to a weighing operation.

I claim as my invention—

1. In an automatic balance, the combination, with the weighing-beam, of a traveling weight, a propelling mechanism adapted to shift the traveling weight, a notched surface in connection with the propelling mechanism, a pawl adapted to engage with the notches of the said surface, an arm fixed to the beam and co-operating with the said pawl, and means for regulating the motion of the propelling mechanism, substantially as and for the purpose described.

2. In an automatic balance, the combination, with the weighing-beam $b$, of a traveling weight $g$, having rack-teeth, a propelling mechanism comprising the driving-weight $c$, the toothed weight-bar $i$, and pinions connecting together the weight $g$ and the bar $i$, a notched surface in connection with the propelling mechanism, a pawl adapted to engage with the notches of the said surface, and an arm fixed to the beam and co-operating with the said pawl, substantially as and for the purpose specified.

3. In an automatic balance, the combination, with the beam $b$, of two or more traveling weights of different sizes, a like number of propelling mechanisms adapted to shift the traveling weights in succession and alternately in opposite directions, notched surfaces in connection with the propelling mechanisms, pawls adapted to engage with the notches of the said surfaces, arms and tongues fixed to the beam, the said arms co-operating with the said pawls, and connections between the tongues and the propelling mechanism, whereby each mechanism, except the first one, is maintained at rest until the preceding one is stopped, substantially as and for the purpose set forth.

4. In an automatic balance, the combination, with the weighing-beam $b$, of two or more traveling weights $g\ g'\ g^2$, &c., of different sizes and having rack-teeth, a like number of propelling mechanisms comprising the driving-weights $c\ c'\ c^2$, &c., the toothed weight-bars $i\ i'\ i^2$, &c., with pins $o$, and pinions connecting the weight-bars with the respective traveling weights, notched surfaces in connection with the propelling mechanisms, pawls adapted to engage with the notches of the said surfaces, arms and tongues fixed to the beam and co-operating with the said pawls, regulating mechanisms having driving-wheels that gear with the teeth on the weight-bars, and double-armed levers connecting together each regulating mechanism, except the first one, with the tongue of the beam relating to the preceding propelling mechanism, substantially as and for the purpose specified.

5. In an automatic balance, the combination of a weighing-beam, a series of traveling weights with rack-teeth, a like number of toothed weight-bars, pinions, and axles connecting the traveling weights with the weight-bars, and numeral-disks $r\ r'\ r^2$, &c., fixed to the said axles, substantially as and for the purpose described.

6. In an automatic balance, the combination of a weighing-beam, a series of traveling weights with rack-teeth, a like number of toothed weight-bars, pinions, and axles connecting the traveling weights with the weight-bars, the numeral-disks $r\ r'\ r^2$, &c., and a recording device comprising the printing-lever $s$, friction-rollers $u\ u'$, ratchet-wheel $v$, lever $v'$, a pawl pivoted thereto, the reciprocating bar $w$, having a pin for operating the lever $v'$, and latch $w'$, pivoted to the bar $w$, substantially as and for the purpose set forth.

In testimony whereof I have hereunto set my hand in the presence of two subscribing witnesses.

CARL SCHENCK.

Witnesses:
JACOB MUELLER,
JEAN GRUND.